April 21, 1959  H. S. PALMER  2,883,076
MATERIAL HANDLING SYSTEM
Filed April 14, 1958  4 Sheets-Sheet 1
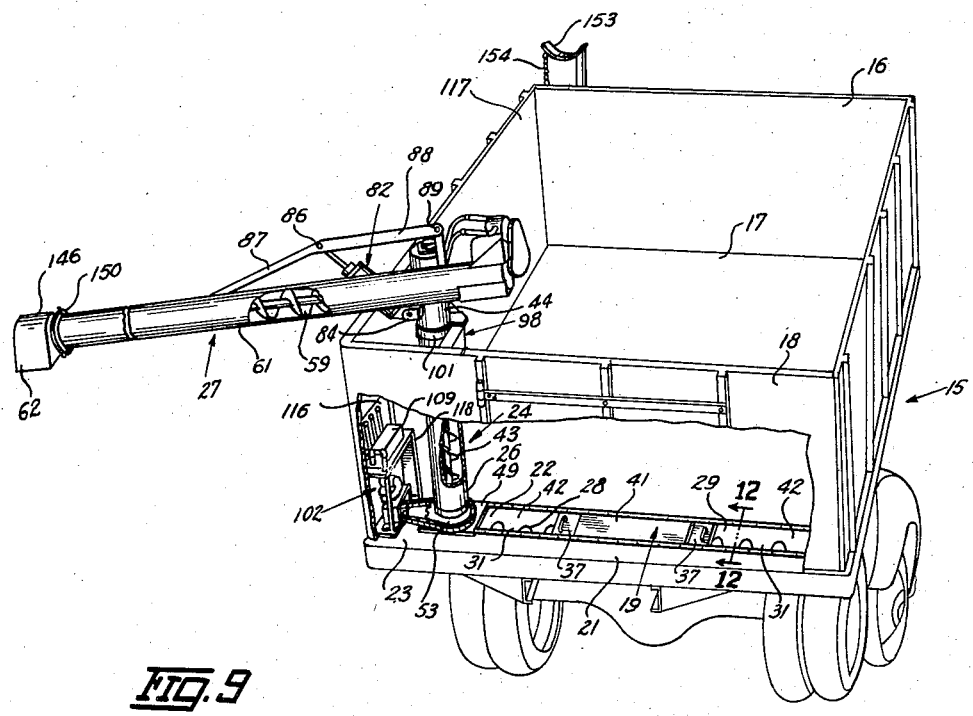
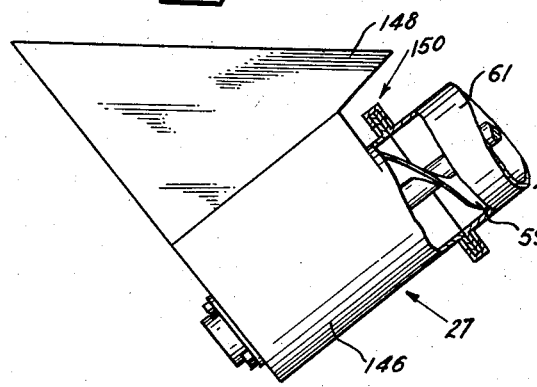
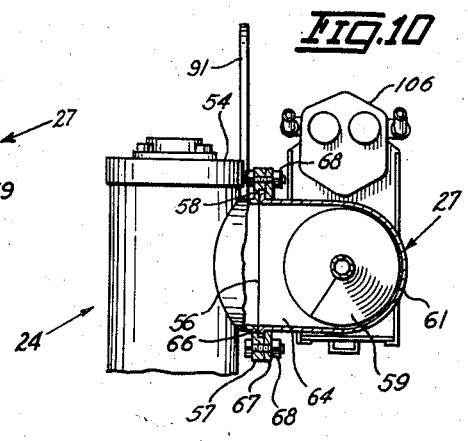
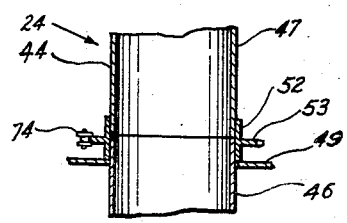
INVENTOR.
HAROLD S. PALMER.
BY
ATTORNEY.

April 21, 1959 H. S. PALMER 2,883,076
MATERIAL HANDLING SYSTEM
Filed April 14, 1958 4 Sheets-Sheet 2
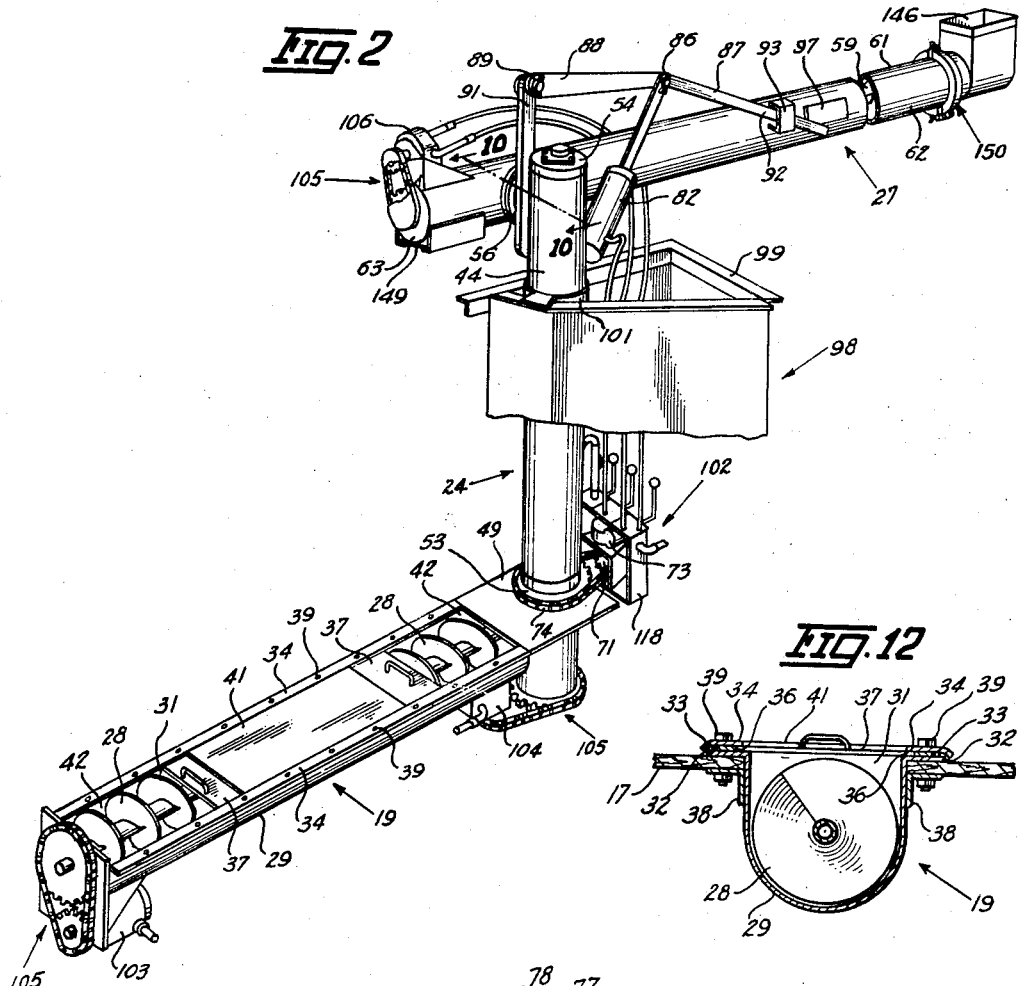
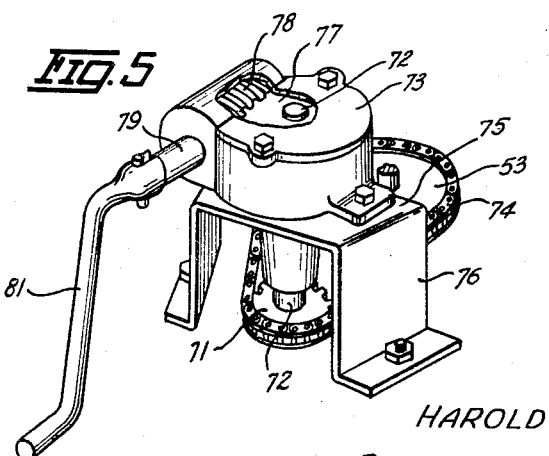
INVENTOR.
HAROLD S. PALMER
BY *Lowell & Henderson*
ATTORNEY.

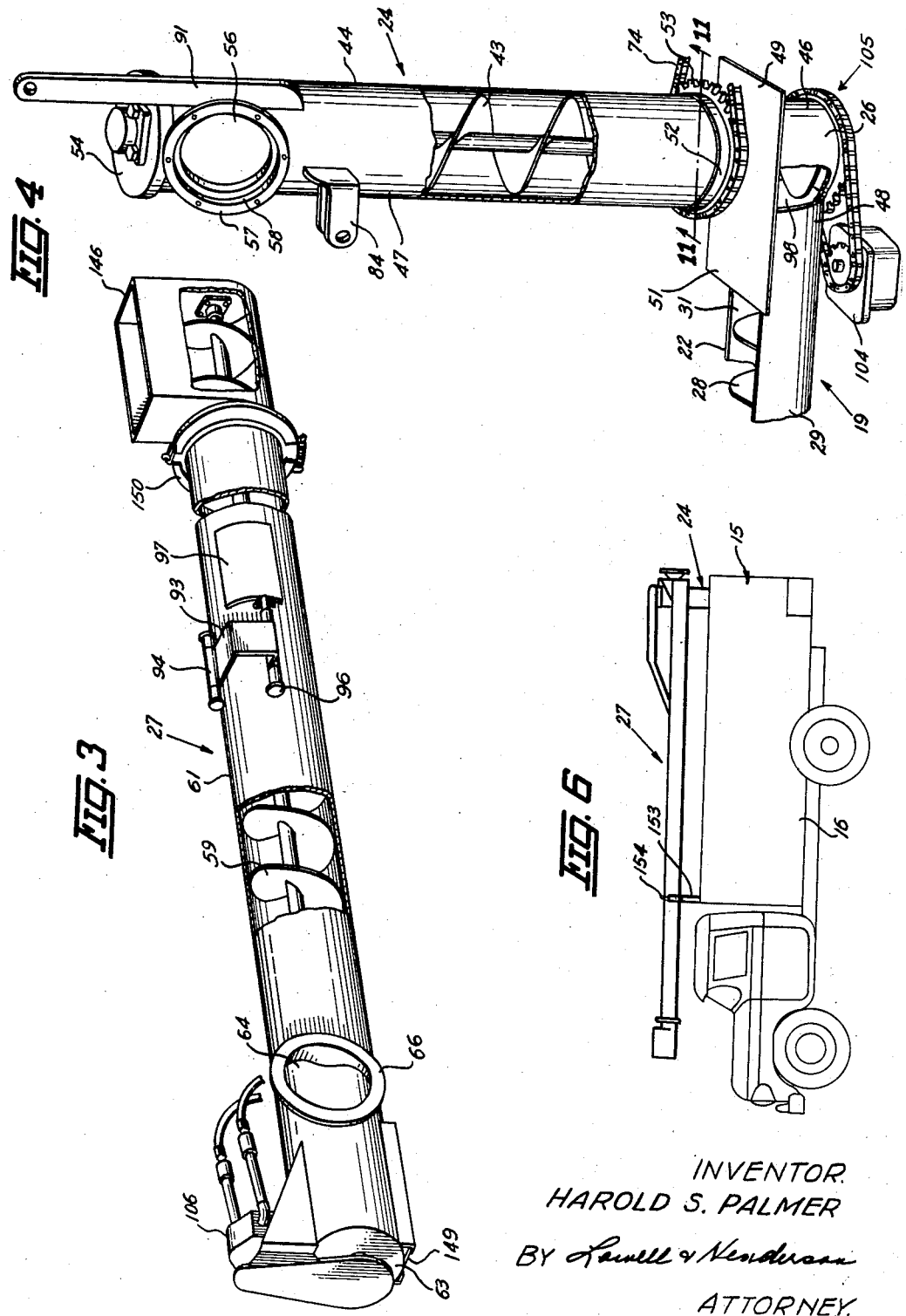

April 21, 1959
H. S. PALMER
2,883,076
MATERIAL HANDLING SYSTEM
Filed April 14, 1958
4 Sheets-Sheet 4
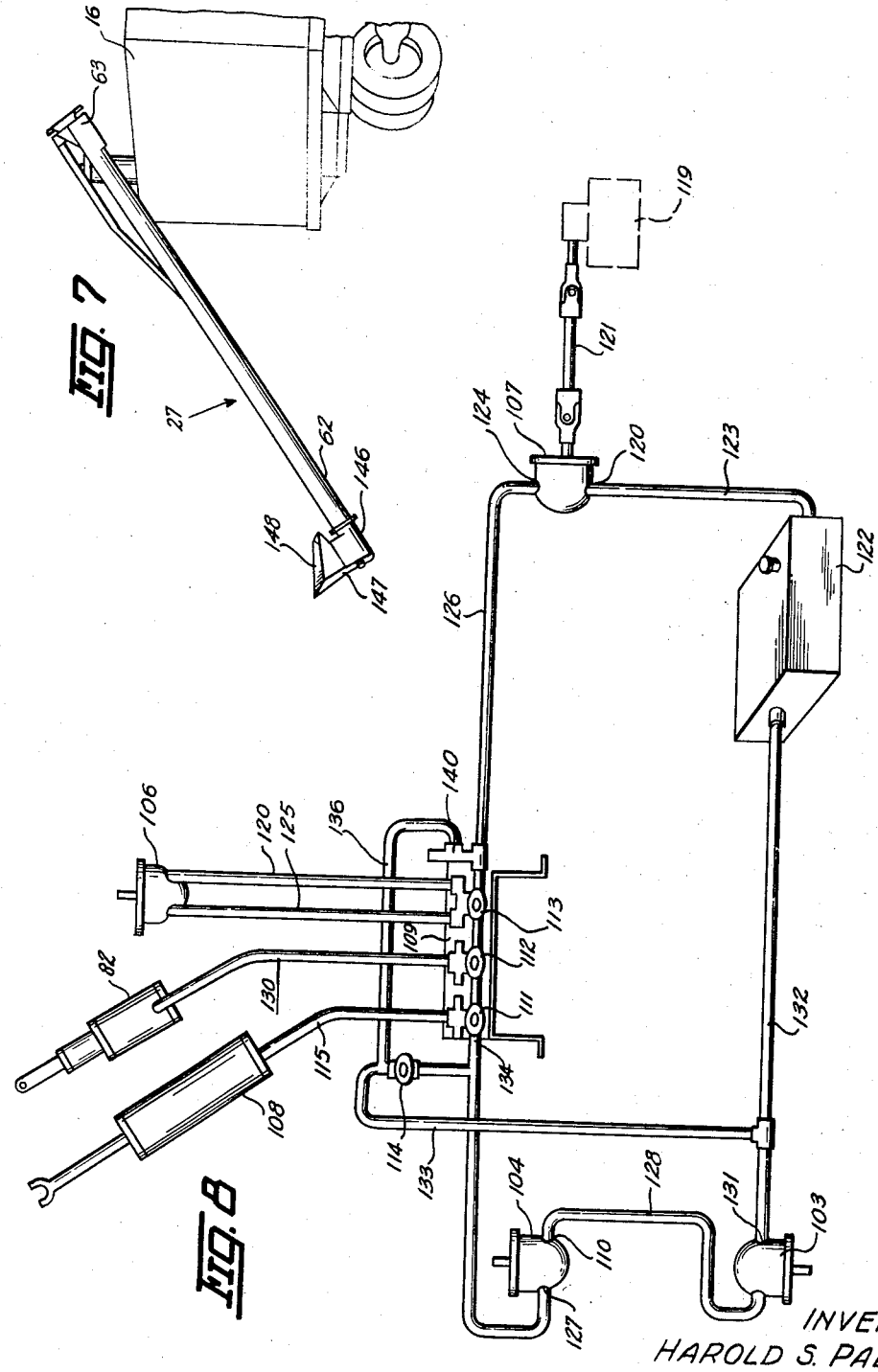
INVENTOR.
HAROLD S. PALMER
BY Powell + Henderson
ATTORNEY.

United States Patent Office 2,883,076
Patented Apr. 21, 1959

2,883,076
MATERIAL HANDLING SYSTEM
Harold S. Palmer, Keota, Iowa
Application April 14, 1958, Serial No. 728,390
3 Claims. (Cl. 214—83.32)

This invention relates generally to material handling systems and in particular to a conveyor system for moving a granular material, such as grain, from and into a truck.

An object of this invention is to provide an improved system for loading and unloading grain from a truck.

Another object of this invention is to provide a conveyor system for a truck which is capable of unloading a bulk material from a truck to different locations remote from the truck, and of receiving bulk material remote from the truck for loading into the truck.

Still another object of this invention is to provide a grain handling system for loading and unloading a truck which is of a construction and assembled on the truck to occupy a minimum of space in storage so as not to interfere with the normal use of the truck.

A further object of this invention is to provide a material handling system for loading and unloading a truck which is of a simple and compact construction, efficient in operation, and adapted to be controlled from a single location.

Another object of this invention is to provide a truck mounted screw type conveyor system for loading and unloading grain, in which a first screw conveyor unit communicated with and supported on a second screw conveyor unit for up and down and horizontal swinging movement relative to the truck body, has a reversible drive means and a coverable opening at one end thereof so that each end of the second conveyor unit can function as an inlet or an outlet.

Still a further object of this invention is to provide a truck mounted screw type conveyor system wherein a plurality of communicable screw conveyor units have independent drive motors which are connected to a common source of power and controlled to selectively drive their corresponding conveyor units.

Further objects, features and advantages of this invention will become apparent from the following description when taken in connection with the accompanying drawing in which:

Fig. 1 is a rear perspective view of a truck showing the material handling system of this invention in assembly relation therewith, with certain parts being broken away for the purpose of clarity;

Fig. 2 is an enlarged perspective view of the material handling system of this invention;

Fig. 3 is a detail perspective view of a swingable conveyor unit which forms a part of the material handling system, with certain parts broken away;

Fig. 4 is a detail perspective view of the assembly of an upright conveyor unit with a portion of a horizontal conveyor unit, which form part of the material handling system of this invention, with certain parts being broken away to more clearly show their construction;

Fig. 5 is a detail perspective view, with certain parts broken away, showing the operating means for rotating the upright conveyor unit;

Fig. 6 is a diagrammatic view showing the material handling system of this invention in transport position on a truck;

Fig. 7 is a diagrammatic view showing the rear part of the truck and an operating position of the material handling system of this invention;

Fig. 8 is a schematic showing of the oil operating system for the material handling system of this invention;

Fig. 9 is an enlarged side elevational detail view of one end of the swingable conveyor unit with some parts broken away and other parts shown in section;

Fig. 10 is an enlarged sectional detail view taken along substantially the line 10—10 in Fig. 2;

Fig. 11 is an enlarged sectional detail view as seen along the line 11—11 in Fig. 1; and Fig. 12 is an enlarged sectional detail view of the horizontal conveyor unit as seen along the line 12—12 in Fig. 1.

With the reference to the drawings, the material handling system of this invention is illustrated in Fig. 1 in assembly relation with a truck, designated generally as 15, having a tiltable dump box 16, a bed 17 and a tail gate 18. A tilting of the box 16 is accomplished in the usual manner by having the bed 17 pivotally supported adjacent its rear end on the truck chassis or main frame (not shown) for pivotal movement about such support by a conventional hydraulic life mechanism, the cylinder assembly only of which is indicated at 108 in Fig. 8.

The material handling system includes a horizontal conveyor unit 19 (Fig. 1) supported from and extended transversely of the truck bed 17 at a position adjacent the rear end 21 of the truck bed, with its discharge end 22 located at the left rear corner 23 of the truck bed. An upright conveyor unit 24 has its lower end 26 in communication with the discharge end 22 of the horizontal conveyor unit 19. Material received from the horizontal conveyor unit 19 is moved upwardly through the upright conveyor unit 24 for discharge into a swingable conveyor unit 27 for unloading of the material from the truck at a location remote from the truck.

The horizontal conveyor unit 19 is of auger type and includes a screw 28 and associated casing 29 (Figs. 2 and 12). The casing 29 is open at its top, with the side walls of the casing to opposite sides of the longitudinally extended top opening 31 terminating in outwardly extended lateral flanges 32. Thus, with the casing within a receiving opening therefor cut out of the truck bed 17, the flanges 32 are supported directly on the truck bed 17. Superposed in order on the top side of each flange 32 are a spacer bar 33 and a holding plate 34 for the bar, with a bar 33 being set in relative to a corresponding flange 32 and holding plate 34 so as to form therewith guideways 36 for slidably receiving covers 37. Elongated pieces of angle iron 38 are positioned to opposite sides of the screw casing 29 and against the underside of the truck bed 17. The angle irons 38, flanges 32, spacer bars 33 and holding plates 34 are all secured together, and to the truck bed 17, by bolt assemblies 39 extended therethrough.

As shown in Figs. 1, 2 and 12, a stationary cover 41 is secured, as by welding, to and between the holding plates 34 over the longitudinal central portion of the horizontal conveyor unit 19 so as to leave openings 42 at opposite sides of the conveyor unit 19, which are communicable with the truck bed 17. A cover 37 is used for closing each opening 42, with a cover 37 being movable in the guideways 36 to positions beneath the stationary cover 41 to uncover a corresponding material receiving opening 42.

The upright conveyor unit 24 is also of auger type having a screw 43 and associated casing 44. As illustrated in Figs. 4 and 11, the casing 44 is comprised of a base section 46 and a main section 47. The base section 46 is of a relatively short length and has a portion of the side wall at its lower end cut away, as indicated at 48 in Fig. 4, which is in communication with the discharge end 22 of the horizontal conveyor unit 19, with the base section 46 being secured, as by welding, to the horizontal conveyor unit 19 at the cutaway portion 48. At a position above the cutaway portion 48 and welded about the base section 46 is a base or supporting plate 49 of a rectangular shape, adapted to rest directly on the truck bed 17. The supporting plate 49 is extended longitudinally of the horizontal conveyor unit 19 and has a portion 51 in a covering relation with the opening 31 at the discharge end 22 of the conveyor unit 19. Thus the portion 51 cooperates with the slidable covers 37 and the stationary cover 41, in closing off the horizontal conveyor unit 19 from material communication with the truck bed 17.

The lower end of the main section 47 of the casing 44 (Figs. 4 and 11) has an external depending collar 52 adapted to fit over the upper end of the base section 46. This manner of connecting the sections 46 and 47, to form the casing 44, additionally provides for the support of the main section 47 directly on the base section 46 for rotation about a vertical axis. Such rotation is accomplished by means, to be later described, which includes a sprocket gear 53 mounted about the collar 52. The main casing section 47 of the upright conveyor unit 24 has a closed upper end 54 and adjacent such upper end is provided with a laterally extended circular outlet 56 (Figs. 4 and 10) that terminates in a radially projected flange 57 having an undercut inner peripheral recess 58.

The swingable conveyor unit 27 is also of auger type (Figs. 2 and 3) having a screw 59 and associated casing 61 open at one end 62 and closed at its end 63. Spaced from the closed end 63 is a laterally extended circular inlet 64 (Figs. 3 and 10) that terminates in a radially projected flange 66 of a diameter and of a thickness to be loosely received within the recess 59 formed on the outlet 56 of the upright conveyor unit 24. The flange 66 is held within the recess 58 by a flat ring member 67 (Fig. 10) mounted about the inlet 64 of the swingable conveyor unit 27 and positionable flat against the flanges 66 and 57. The ring 67 is clamped to the flange 57 by bolt assemblies 68 whereby the swingable conveyor unit 27 is supported on the upright conveyor unit 24 for rotational up and down movement about a horizontal axis. It is to be noted that by virtue of this connection of the conveyor units 24 and 27 that the conveyor unit 27 is rotatable with the conveyor unit 24 about a vertical axis, and is rotatable independently of the upright conveyor unit 24 about a horizontal axis.

Rotation of the upright conveyor unit 24 about its vertical axis is accomplished by means including the sprocket gear 53, previously described (Fig. 5), and a sprocket gear 71 mounted at the lower end of an upright shaft 72 supported in a gear housing 73, and connected with the gear 53 by a sprocket chain 74. The gear housing 73 is mounted on a bracket 75 having upstanding legs 76 adapted to be secured directly to the truck bed 17. The upper end of the shaft 72, within the gear housing 73 has a worm gear 77 which is in continuous engagement with a worm 78 carried on a horizontal shaft, supported in the housing 73 and having one end 79 projected outwardly from the housing 73. A crank 81 is removably connectible with the projected shaft end 79, for rotating the worm 78, and through the shaft 72 and gears 71 and 53, the vertical conveyor unit 24.

Rotation of the swingable conveyor unit 27 about its horizontal axis relative to the upright conveyor unit 24 is accomplished by means including a cylinder assembly 82 (Figs. 1 and 2). One end of the cylinder assembly is pivotally connected at 83 to a bracket 84 (best shown in Fig. 4) which is welded to the casing 44 of the upright conveyor unit 24 at a position below the outlet 56. The other end of the cylinder assembly 82 is connected at 86 to a lever arm 87 at a position between the opposite ends of the lever arm 87 (Figs. 1 and 2). The end 88 of the lever arm 87 is pivoted at 89 to the top of an upright support 91 secured, as by welding, to the casing 44 of the upright conveyor unit 24, to one side of the outlet 56 (Fig. 4) so as to project upwardly from the upright conveyor unit 24. As best appears in Figs. 1 and 4 the axes for the pivots 89, 83 and 86 are in a parallel relation with the axis of the outlet 56, and in turn with the horizontal axis of rotation for the adjustable conveyor unit 27.

The free end portion 92 of the lever arm 87 is loosely extended through a loop member 93 (Figs. 2 and 3) secured to the side wall of the casing 61 for the adjustable conveyor unit 27, at a position between the conveyor inlet 64 and its end 62. The loop member 93 has one end hingedly connected at 94 to the casing 61 and its other end releasably connected to the casing 61 by means including a removable pin 96. Thus on removal of the pin 96 the loop member 93 is freely pivoted to an open position relative to the casing 61 to provide for the location of the lever arm 87 against the casing 61, after which the loop member 93 is closed and locked. Adjacent the loop member 93 is a wear plate 97 to protect the side wall of the casing 61.

As previously described, in the assembly of the material handling system of this invention, the horizontal conveyor unit 19 is located substantially below the level of the truck bed 17 with its discharge end 22 at the left rear corner 23 of the truck bed (Fig. 1). With the connection of the base section 46 of the casing 44 to the discharge end 22 of the horizontal conveyor unit 19, as described in connection with Fig. 4, and with the rotatable support of the main section 47 of the casing 44 on the base section 46, the upright conveyor unit 24 is also located in the left rear corner of the truck bed and is projected upwardly so that its outlet 56 is above the top level of the truck box 16. It is seen, that when the adjustable conveyor unit 27 is in a horizontally disposed position as illustrated in Fig. 1, it may be rotated with the upright conveyor unit 24 to locate its end 62 opposite any side of the truck 15.

A wall structure or partition designated generally as 98 (Figs. 1 and 2) encloses the upright conveyor unit 24 within the left rear corner of the truck and constitutes a part of the side wall for the containing of material within the truck box 16. An upper frame member 99 for the wall structure 98 carries a stabilizing ring 101, loosely extended about the casing 44, for supporting the upright conveyor unit 24.

It is seen, therefore, that the horizontal conveyor unit 19 is substantially at the level of the truck bed 17 and that the upright conveyor unit 24 is in the left rear corner of the truck bed 17, so that the effective capacity or volume of the truck box 16 for holding material is reduced by only a relatively small amount. It is to be noted also that the operating mechanism for rotating the upright conveyor unit 24 is completely within the enclosure at the left rear corner of the truck bed 17, as defined by the partition wall 98, as is also a control mechanism 102, to be later described, for the conveyor units 19, 24 and 27.

These conveyor units are hydraulically operated, by an oil system best shown in Fig. 8. The screws 28, 43 and 59 for the conveyor units 19, 24 and 27, respectively, are independently driven by corresponding oil motors 103, 104 and 106 through gear and chain assemblies designated generally as 105 (Fig. 2). Oil under pressure is supplied to the oil motors 103, 104 and 106 from a common oil pump 107 (Fig. 8). A cylinder assembly forming part of the lift mechanism for tilting the truck box 16 is indicated at 108. The control mechanism 102 includes a box 109 having control valves 111, 112 and 113 corresponding respectively to the cylinder assembly 108 for the truck box lift mechanism, the cylinder assembly 82 for the adjustable conveyor unit 27, and the oil motor 106 for the conveyor unit 27. A control valve 114 for controlling the operation of the oil motors 103 and 104 is located outside of the control box 109. As shown in Fig. 1, all of the control valves 111, 112, 113 and 114 are accessible at the left rear corner 23 of the truck bed 17, through an opening 116 formed in the side wall 117 of the truck box 16. The control box 109 is mounted on a bracket 118 which is adapted to fit over the gear housing 73 for direct support on the truck bed 17. The shaft end 79, projected from the housing 73 is opposite the opening 116 formed in the truck box side wall 117 for ready connection and disconnection with the crank handle 81.

The pump 107 (Fig. 8) is driven from a power take off 119, provided on the truck 15, through a shaft 121 and has its inlet 120 connected with an oil tank or reservoir 122 through a pipe line 123. The outlet 124 of the pump 107 is connected through a line 126 with the inlet 127 of the oil motor 104 for the upright conveyor unit 24, with the valves 111, 112 and 113 being connected in series in the line 126 within the control box 109. The outlet 110 of the oil motor 104 is connected through a pipe 128 with the inlet 129 of the oil motor 103, which in turn has the outlet 131 thereof connected through a line 132 with the oil tank 122.

The hydraulic cylinder assemblies 82 and 108 for the swingable conveyor unit 27 and truck hoist, respectively, are of single acting type with the assembly 82 being operatively associated with the valve 112 through a line 130, and the assembly 108 with the valve 111 through a line 115. The oil motor 106 for the conveyor unit 27 is of a reversible type and has two lines 120 and 125 connected with its associated control valve 113.

The valve 113 is of a type movable to two positions from a neutral position, with a first position providing for rotation of the screw 59 for the conveyor unit 27 in a clockwise direction, as viewed in Fig. 1, to feed material in a direction toward the conveyor unit end 62, and with the second position of the control valve 113 providing for a reversed rotation of the screw 59 whereby to feed material in an opposite direction toward the end 63 of the conveyor unit 27.

A bypass line 133 (Fig. 8) has one end connected to the line 132 at a position between the outlet 131 of the oil motor 103, and the oil tank 122, with its other end being connected to the line 126 at a position between the outlet 134 of the control box 109 and the inlet 127 of the oil motor 104. The control valve 114, for controlling the operation of the oil motors 103 and 104 is connected in the bypass line 133.

A second bypass line 136, having a pressure regulating valve 140 connected therein, has one end connected to the line 126 at a position between the control box inlet 137 and the outlet 124 of the pump 107, and its other end connected to the first bypass line 133 at a position between the control valve 114 and the connection of the bypass line 133 with the line 132.

In the operation of the material handling system of this invention, assume that material is to be unloaded from the truck 15 and that the truck box 16 is in its tilted position, and the swingable conveyor unit 27 in its unloading position, both as shown in Fig. 1. Tilting of the the box 16, with the motor 107 in operation, is accomplished by manipulation of the valve 111, and the position of the conveyor unit 27 to an unloading position is accomplished by a relative manipulation of the crank 81 for rotating the upright conveyor unit 24, and the control valve 112 for operating the cylinder assembly 82.

With the control valve 114 (Fig. 8) in an open position, the valve 113 is manipulated to its first position providing for the rotation of the screw 59 to feed material toward the end 62 of the conveyor unit 27. With such manipulation of the valve 113, oil under pressure from the pump 107 flows through the line 126 into the control valve 113, through pipe 120 to the oil motor 106, and outwardly from the oil motor 106 through the pipe 125 back to the control valve 113 for return to the line 126. With the valve 114 in its open position, the major portion of the oil in line 126 flows through the bypass line 133 and through the line 132, into the oil tank 122 for return to the pump 107 through the line 123. The oil permitted to pass through the line 126 to the oil motor 104 is under a pressure insufficient to effect any operation of the oil motor 104 and in turn of the oil motor 103. As a result, only the oil motor 106 for the conveyor unit 27 is in operation.

On closing of the control valve 114 the oil flow system for the oil motor 106 remains unchanged. However, with the flow of oil through the bypass line 133 shut off by the valve 114, oil through the line 126 from the control box outlet 134 passes through the oil motor 104, into the line 128 and through the oil motor 103 into the line 132 and tank 122 for return to the pump 107 through the line 123.

All of the conveyor units 19, 24 and 27 are thus set into operation, whereby material from the truck box 16 passing through the receiving openings 42 of the horizontal conveyor unit 19, as opened by the cover members 37, is moved by the conveyor unit 19 into the lower end of the upright conveyor unit 24 for travel therethrough and into the conveyor unit 27 for discharge from its end 62, which is provided with a directing hood member 146, shown in Fig. 1.

The casing 61 at the end 63 of the conveyor unit 27 has its lower side formed with an opening (not shown) that is closed by a slidable cover member 149 (Figs. 2 and 3) when the material handling system is used for truck unloading purposes. For loading material into the truck, the cover 149 is moved to an open position to provide for the opening at the end 63 of the conveyor unit 27 functioning as a discharge outlet, and with its end 62 functioning as a receiving or intake end of the conveyor unit. As best appears in Fig. 7, the end 63 of the conveyor unit 27 extends within the truck box 16, and its end 62 is supported on, or moved to a position adjacent the ground surface.

With the conveyor unit 27 as positioned in Fig. 7, with its open end 63 above the truck box 16 and its end 62 provided with a hopper attachment 148, the valve 114 (Fig. 8) is opened, and the valve 113 is moved to its second or reversed position, relative to its position for unloading material from the truck box 16. Oil under pressure from the pump 107 thus flows through the line 126, into the valve 113, and through the line 125 into the oil motor 106 from which it is returned to the valve 113 through the line 120. The oil thus returned to the valve 113 flows back into the line 126 for flow through the bypass line 133, to the line 132, oil tank 122 and back to the pump 107 through the line 123. The conveyor units 19 and 24 are not operated for the loading of material into the truck box 16, so that the upright conveyor unit 24 is ineffective to move material in either direction therethrough. As a result, material fed into the hopper attachment 148 is carried upwardly through the conveyor unit 27 for discharge into the truck box 16 through the opening in its end 63.

In some instances, during loading of the truck 15, it may be possible to eliminate any manual supplying of material into the hopper attachment 148, as by inserting the end 62 of the conveyor unit 27 directly into a bin or the like. For this purpose, the hood 146 is releasably connected to the casing 61 by a clamp ring assembly indicated generally as 150 (Figs. 2, 3 and 9). On removal of the hood attachment 146 the auger 59 has a portion thereof extended outwardly from the casing 61. By inserting the projected auger end within a bin, material is picked up directly by the auger 59 for loading into the truck box 16 in the same manner as above described.

In transport, the adjustable conveyor unit 27 is moved to a horizontal position extended longitudinally of the truck 15, so as to lay above and along one side of the truck box 16, as best shown in Fig. 6. The front end of the box 16, at the upper left hand corner thereof is provided with a hanger structure 153 (Figs. 1 and 6) to support the casing 61. A chain 154 is then extended about the casing 61 to hold it in place within the hanger 153.

With the conveyor unit 27 thus positioned, and with the upright conveyor unit 24 located within the left rear corner of the truck box, it is seen that the material handling system of this invention substantially eliminates any interference with a normal use of the truck for the handling of any kind of material. It will also be noted that the conveyor unit 27 is of an appreciable length, greater than the length of the truck box 15, so as to efficiently provide for the loading and unloading of material at positions remote from the truck.

Although the invention has been described with respect to a preferred embodiment thereof it is to be understood that it is not to be so limited since changes can be made therein which are within the full intended scope of this invention as defined in the appended claims.

I claim:

1. A material handling system for a truck having a truck bed with a box thereon, a horizontal conveyor unit communicating with the truck bed, an upright screw conveyor unit having the lower end thereof in communication with said horizontal conveyor unit, means supporting said upright conveyor unit on said truck bed for rotation about a vertical axis at a position within a rear corner of said box, a second screw conveyor unit in communication with said upright conveyor unit and rotatably supported between its ends on said upright conveyor unit for rotation about a horizontal axis at a position above the level of said box, whereby said second conveyor unit is swingable with said upright conveyor unit about said vertical axis and swingable relative to said upright conveyor unit about said horizontal axis, with said second conveyor unit adapted to be extended above and along one side of said box in a transport position, and vertically movable to a truck box loading position with one end thereof adjacent a ground surface and the other end thereof extended within the confines of said box, and to a box unloading position with said one end moved to an adjusted position relative to said vertical and horizontal axes, said other end having an opening therein, a cover to close said opening when said second conveyor unit is in unloading position, and to open said opening when said second conveyor unit is in a loading position, a motor means separately associated with each of said conveyor units, with the motor means for said second conveyor unit being of a reversible type, and means for selectively controlling the operation of said motor means.

2. A material handling system for a truck having a truck bed including an upright screw conveyor unit in a rear corner thereof, means supporting said conveyor unit on said truck bed for rotation about a vertical axis, a horizontal conveyor unit on said truck bed communicating with the lower end of said upright conveyor unit, a third screw conveyor unit rotatably mounted between the ends thereof adjacent the upper end of said upright conveyor unit for swingable movement about a horizontal axis relative to said upright conveyor unit and for rotational movement with said upright conveyor unit, with one end of said third conveyor unit having an opening therein, a cover means for said opening, a separate drive motor for each of said conveyor units, with the drive motor for said third conveyor unit being of a reversible type, and means for selectively controlling the operation of said drive motors, said opening constituting a discharge outlet and being uncovered, and the other end of said third conveyor unit constituting a material receiving inlet, when said third conveyor unit is operated in one direction to load material into said truck, and said opening being covered and said other end of the third conveyor unit constituting a material discharge outlet when said third conveyor unit is operated in a reversed direction to unload material from said truck bed, with said third conveyor unit being movable to a horizontal transport position extended longitudinally or said truck bed.

3. A material handling system for a truck having a truck bed comprising an upright screw conveyor unit supported on said bed for rotational movement about a vertical axis, means for feeding material from said truck bed to the lower end portion of said upright screw conveyor unit, a swingable screw conveyor unit rotatably supported adjacent one end thereof on the upper portion of said upright screw conveyor unit for up and down movement, with said swingable conveyor unit and said upright conveyor unit having adjacent side portions thereof in communication, drive motors corresponding to said conveyor units, with the drive motor for said swingable conveyor unit being of a reversible type, means for selectively controlling the operation of said drive motors, said swingable conveyor unit having an opening at said one end thereof and a cover for said opening, so that when said opening is covered material is successively moved by said feed means, upright conveyor unit and swingable conveyor unit from said truck bed for discharge from the other end of said swingable conveyor unit, and when said opening is uncovered and positioned above said truck bed and said feed means and upright conveyor means are stopped, material supplied to said other end of the swingable conveyor unit is discharged from said opening onto said truck bed on a reversed operation of the drive motor for said swingable conveyor unit, relative to the operation thereof for moving material from said truck bed.

References Cited in the file of this patent

UNITED STATES PATENTS 2,633,255   Hoffstetter _____ Mar. 31, 1953